Figure 1:
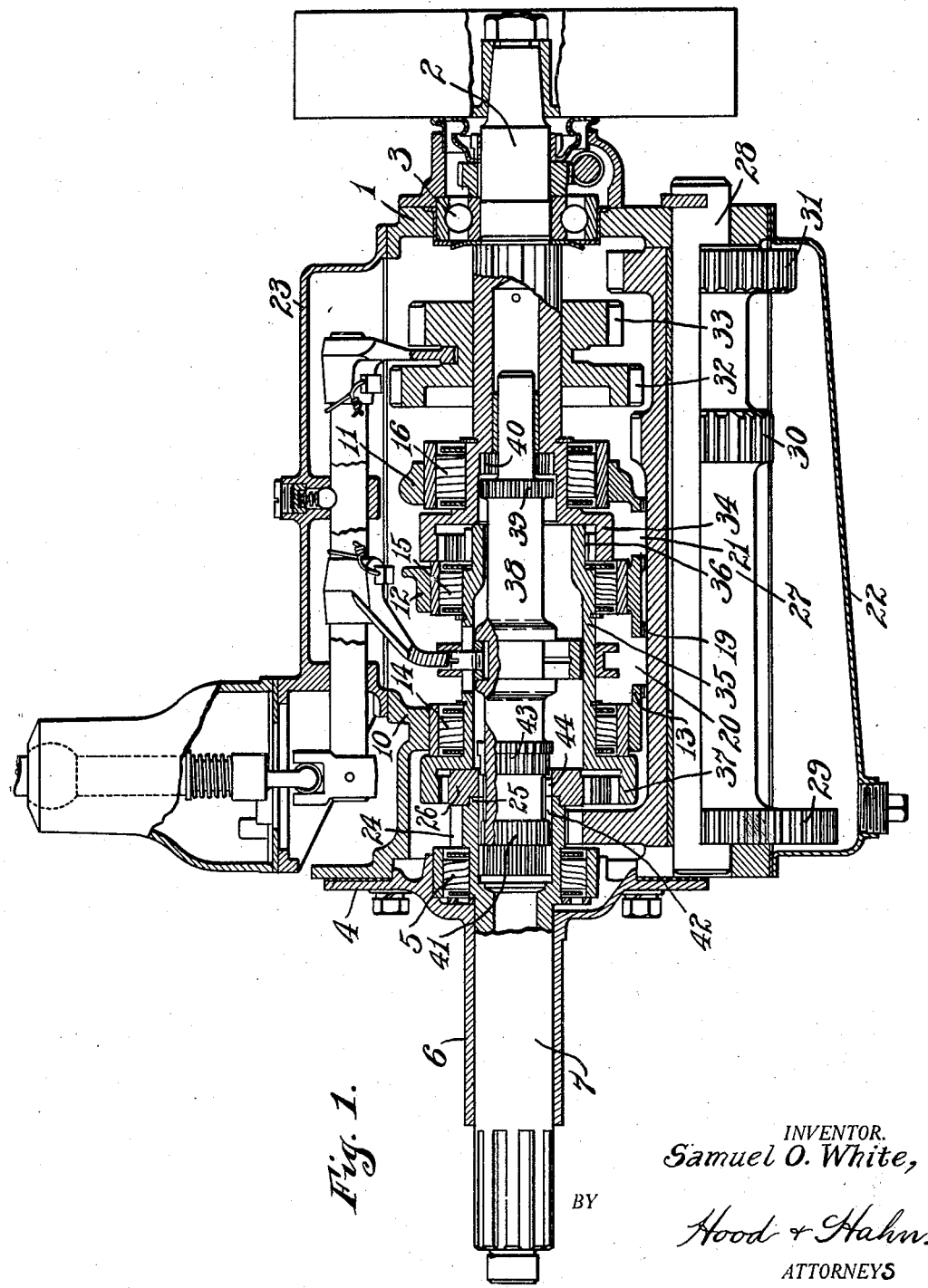

Nov. 11, 1930.    S. O. WHITE    1,780,958
OILING MEANS FOR TRANSMISSION GEARING
Filed Dec. 3, 1928    2 Sheets-Sheet 1

INVENTOR.
Samuel O. White,
BY
Hood & Hahn.
ATTORNEYS

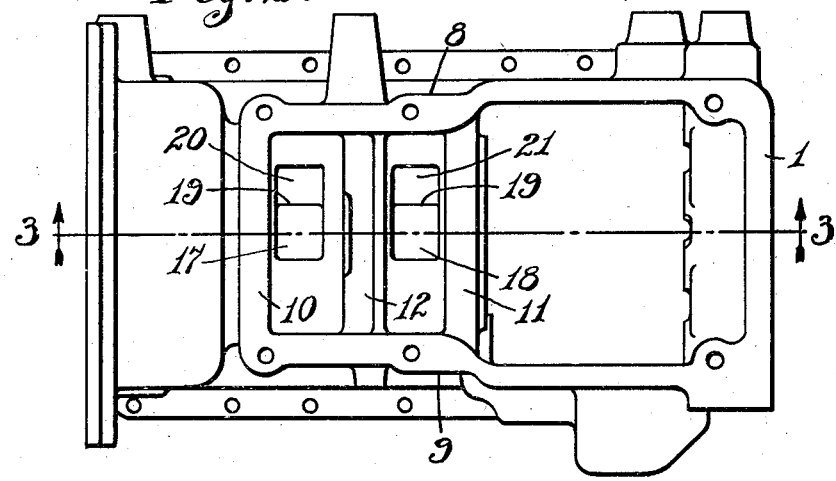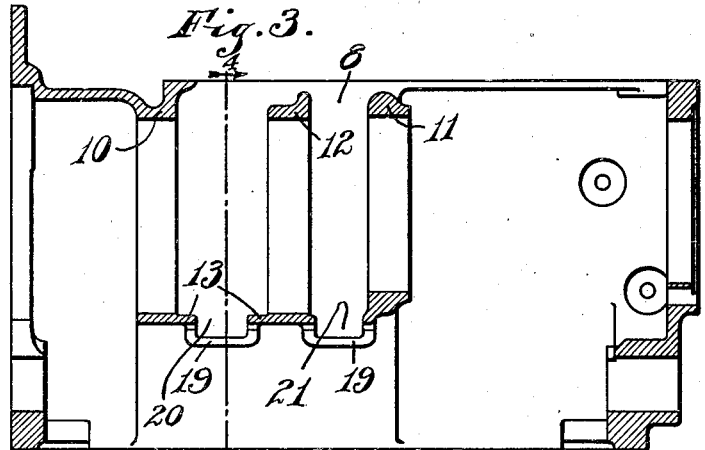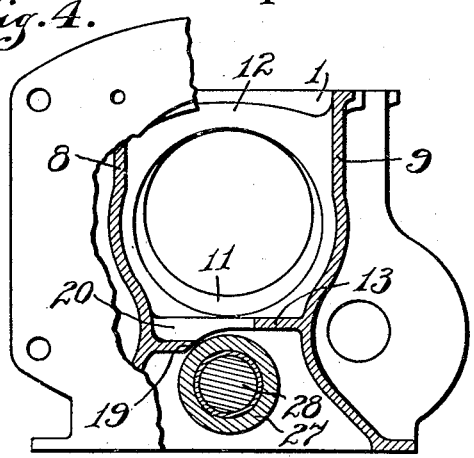

Patented Nov. 11, 1930

1,780,958

UNITED STATES PATENT OFFICE

SAMUEL O. WHITE, OF MUNCIE, INDIANA

OILING MEANS FOR TRANSMISSION GEARING

Application filed December 3, 1928. Serial No. 323,434.

My invention relates to improvements in transmission gearing for automobiles and particularly to means for lubricating the same.

For the purpose of disclosing my invention I have illustrated one improvement thereof on the accompanying drawings on which Fig. 1 is a longitudinal sectional view of a transmission embodying my invention, Fig. 2 is a plan view of the transmission casing, Fig. 3 is a longitudinal sectional view thereof on the line 3—3 of Fig. 2 and Fig. 4 is a transverse sectional view on the line 4—4 of Fig. 3.

In the embodiment illustrated I provide a casing in which the transmission is adapted to be mounted. This casing is provided with a rear end wall 1 having a suitable opening therein through which the power receiving shaft 2 is adapted to project and which opening is large enough to accommodate the bearings 3 for the shaft. The front wall 4 of the casing is preferably removable and is provided with a bearing 5 and bearing sleeve 6 through which extends the power delivery shaft 7 of the transmission. Extending transversely between the side walls 8 and 9 of the casing, towards the forward end, are a pair of transversely extending bridges 10 and 11, and an intermediate bridge 12. These bridges are integrally cast with the casing and the side walls thereof and are connected at their bottoms by a bottom wall 13, thereby forming between the bridges 10 and 11 a pocket the bottom wall of which is considerably higher than the bottom edge of the casing. The bridges have suitable openings therein to accommodate roller bearings 14, 15 and 16, the purpose of which will appear more fully hereinafter. In the bottom wall 13, on either side of the intermediate bridge 12 I provide openings 17 and 18 the side walls 19 of which form the forward edges of wells or pockets 20 and 21 which wells or pockets in effect form scoops for a purpose more fully hereinafter described. The casing has secured to its bottom a suitable oil pan 22 which is bolted or otherwise secured in position and is closed on its top by a top cover 23 in which is mounted the shifter forks, etc., for the transmission.

The power delivery shaft 7 projects into the casing being supported on the bearing 5 and has at its inner end a gear 24 which may be integrally formed on the shaft or may be in the form of a gear secured on the shaft to rotate therewith. The end of the shaft beyond this gear is provided with a shoulder 25 adapted to support a gear 26 which is rotatably mounted thereon. The gear 24 is adapted to drive a counter shaft in the form of a sleeve 27 rotatably mounted on a stationary shaft 28 on the bottom of the casing and extending through openings in the front and rear walls of the casing. This shaft carries a gear wheel 29 meshing with the gear 24 and is also provided with a pair of gears 30 and 31 adapted to mesh respectively with the gears 32 and 33 splined on the power receiving shaft 2. The inner end of the power receiving shaft is supported in the bearings 16 and is provided with an internal gear 34. Mounted on the bearings 14 and 15 and eccentrically to the shafts 2 and 7 is a hollow hub 35 which carries at one end an external gear 36 adapted to mesh with the internal gear 34 and at the opposite end an internal gear 37 adapted to mesh with the external gear 26.

Extending through the hub 35 and having its opposite end telescoped into the hollow ends of the shafts 2 and 7 is a supplemental shaft 38 having at one end external dental clutch teeth 39 adapted when the shaft is longitudinally moved in one direction to engage the internal dental clutch teeth 40. This shaft 38 at its opposite end is provided with an external set of dental clutch teeth 41 constantly in mesh with an internal set of teeth 42 in the hollow end of the shaft 7, and with a second set of teeth 43 adapted, when the shaft is moved longitudinally in one direction to mesh with an internal set of teeth 44 on the gear 26.

In operation by moving the gear 32 into mesh with the gear 30 the power receiving shaft will be driven from the power delivery shaft at its lower speed. By shifting the gear 33 into mesh with the gear 31 the power receiving shaft will be driven at its next higher speed. By shifting the supplemental shaft 38 forwardly the teeth 43 will be moved into engagement with the teeth 44 of the gear 26, the teeth 39 being out of engagement with the teeth 40. The gear wheel 26 will thus be locked to the power delivery shaft 7 and power will be delivered to the power receiving shaft 2 from this gear 26 through the internal gear 37, the hub 35, the external gear 36, the internal gear 34 to the shaft 2. This will drive the shaft 2 at its next highest speed or at third speed. To drive the power receiving shaft at its highest speed the shaft 2 is directly connected to the shaft 7 by shifting the intermediate shaft 38 rearwardly until the teeth 39 engage the teeth 40. Under these circumstances with the teeth 41 and 42 in constant mesh and the teeth 39 and 40 in mesh, while the teeth 43 are out of mesh with the teeth 44 the power receiving shaft will be directly driven from the power delivery shaft.

The edges 19 of the pockets 20 and 21, as shown in Fig. 4 are in extremely close proximity to the shaft 27.

In actual practice I have found that one-sixty-fourth of an inch is sufficient clearance. The bottom of the casing provides an oil well and the oil therein may be maintained at a level sufficient to almost cover the shaft 27. Under these circumstances with the transmission in operation this shaft 27 running the oil picks up a considerable quantity thereof on its surface and as it "wipes" past the edges 19 this oil is scraped off and forced through the openings 17 and 18 into the pocket formed by the bottom 13 and the transversely extending bridges 10 and 11. In actual practice sufficient oil, when the transmission is running for any length of time, is forced up by this means through the openings 17 and 18 to such an extent as to completely fill this supplementary oil well and overflow the top of the wall 11, flowing back down into the bottom of the casing. The oil thus delivered into the supplementary well thoroughly bathes the bearings 14, 15 and 16 as well as the gears 34 and 36 and remaining parts in oil so that all these parts are throughly lubricated. Furthermore, a certain portion of the oil will work into the hub 35 and out through its front end into the gear 37 thus thoroughly lubricating this gear before it flows back into the oil well.

I claim:

1. In an automobile transmission the combination with an enclosing casing of driving and driven shafts projecting through the end walls of said casing, a transmission gearing for drivingly connecting said shafts and operating in a plane higher than the normal oil level in said casing, a supplemental shaft operating in said casing below said gears and in the oil adapted to be maintained in said casing and a supplemental oil reservoir for supplying oil to said gears and having bottom openings therein in such close proximity to said supplemental shaft that the walls of said opening will scoop the oil picked up by said shaft therefrom forcing it through said openings into said supplemental reservoir.

2. In an automobile transmission the combination with an enclosing casing of driving and driven shafts projecting through the end walls of said casing, transmission gearing for drivingly connecting said shafts and operating in a plane higher than the normal oil level in said casing, a supplemental oil reservoir within said casing for supplying oil to said transmission and having bottom openings therein above the normal oil level in said casing and a rotatable shaft mounted in said casing and adapted by its rotation to force the oil from the bottom of said casing through said bottom openings and to said supplemental oil reservoir.

3. In an automobile transmission the combination with an enclosing casing, transversely extending webs connected to the side walls of said casing and having their bottoms connected to form a pocket above the normal oil level in said casing, said bottom being provided with openings therein and a rotatable shaft mounted in the casing beneath said openings and adapted by its rotation to force the oil from the bottom of the casing through said openings.

4. In an automobile transmission the combination with an enclosing casing of driving and driven shafts projected through the end walls of said casing, transmission gearing for driving the connected said shaft operating in a plane higher than the normal oil level in said casing, a supplemental oil reservior within the casing above the normal oil level for supplying oil to said gearing, a supplemental shaft operated in the bottom of said casing in the oil thereof and means on the bottom of the supplemental reservoir for scooping the oil from the periphery of said shaft during the rotation thereof and delivering the same to said supplemental oil reservoir.

5. In an automobile transmission the combination with an enclosing casing of driving and driven shafts through the end walls of said casing, a transmission gearing for drivingly connecting said shafts and operating in a plane higher than the normal oil level in said casing, a supplemental oil reservoir within the casing above the normal oil level thereof, said supplemental reservoir having oil receiving openings in the bottom thereof, a supplemental shaft rotating in the bottom of the casing and in an oil bath and means for scooping the oil film from said shaft as it is rotated in said bath and causing the same to be delivered through said openings.

6. In an automobile transmission the combination with an enclosing casing of driving and driven shafts projecting through the end walls of said casing, transversely extending longitudinally spaced apart webs in said casing connected at their bottoms and forming a supplemental oil well above the normal level of said casing, transmission gearing arranged between said webs and in said well, bearings in said webs for said gearing, a rotatable supplemental shaft operating in the oil contained in said casing and adapted to force oil to said supplemental well through bottom openings in said supplemental well.

In witness whereof, I, SAMUEL O. WHITE, have hereunto set my hand at Muncie, Indiana, this 15th day of November, A. D. one thousand nine hundred and twenty-eight.

SAMUEL O. WHITE.